US012669016B2

(12) United States Patent
Leng

(10) Patent No.: US 12,669,016 B2
(45) Date of Patent: Jun. 30, 2026

(54) STEPPING PLATFORM OF FOLDABLE LADDER

(71) Applicant: New-Tec Integration (Xiamen) Co., Ltd., Xiamen City (CN)

(72) Inventor: Luhao Leng, Xiamen City (CN)

(73) Assignee: New-Tec Integration (Xiamen) Co., Ltd., Xiamen City (CN)

( * ) Notice: Subject to any disclaimer, the term of this patent is extended or adjusted under 35 U.S.C. 154(b) by 413 days.

(21) Appl. No.: 18/369,743

(22) Filed: Sep. 18, 2023

(65) Prior Publication Data

US 2024/0301751 A1 Sep. 12, 2024

(30) Foreign Application Priority Data

Mar. 6, 2023 (CN) ......................... 202320391979.4

(51) Int. Cl.
*E06C 1/393* (2006.01)
*E06C 1/20* (2006.01)
*E06C 7/08* (2006.01)

(52) U.S. Cl.
CPC ................ *E06C 1/393* (2013.01); *E06C 1/20* (2013.01); *E06C 7/08* (2013.01)

(58) Field of Classification Search
CPC . E06C 1/393; E06C 1/16; E06C 1/387; E06C 1/38; E06C 7/08; E06C 7/081; E06C 7/082
USPC ..................... 182/228.1, 159, 90, 91; 52/188
See application file for complete search history.

(56) References Cited

U.S. PATENT DOCUMENTS 3,022,857 A * 2/1962 Rich ......................... E06C 7/08 182/216
4,496,029 A * 1/1985 Kuroda ................... E04G 1/152 182/119
4,716,988 A * 1/1988 Graffy ....................... E06C 7/08 182/228.5
6,427,805 B1 * 8/2002 Gibson ................... E06C 1/387 182/165
7,090,053 B2 * 8/2006 Bothwell ................ E04G 1/153 182/222

(Continued)

FOREIGN PATENT DOCUMENTS

CN 101684720 B * 6/2012 ............. E06C 1/393
CN 106617681 A * 5/2017 ............. A47B 13/08

*Primary Examiner* — Brian E Glessner
(74) *Attorney, Agent, or Firm* — COOPER LEGAL GROUP LLC

(57) ABSTRACT

A stepping platform of a foldable ladder comprises a plate body, a front end cap, and a rear end cap. The plate body, when in use, is rotatably supported between two front leg tubes of the foldable ladder. The front end cap and the rear end cap are respectively connected to the plate body from a front-and-rear direction. A bottom of the plate body comprises a plurality of protruding strips. The plurality of protruding strips are hollow. The plurality of protruding strips are arranged at intervals. The front end cap comprises a plurality of first inserting pins configured to correspond to the plurality of protruding strips, and the rear end cap comprises a plurality of second inserting pins configured to correspond to the plurality of protruding strips. The plurality of first inserting pins and the plurality of second inserting pins are respectively inserted into the plurality of protruding strips.

11 Claims, 4 Drawing Sheets

(56) References Cited

U.S. PATENT DOCUMENTS

| | | | | |
|---|---|---|---|---|
| 8,776,947 | B1 * | 7/2014 | Wurth | E06C 7/48 182/1 |
| 2008/0179138 | A1 * | 7/2008 | Parker | E06C 1/393 182/106 |
| 2011/0147123 | A1 * | 6/2011 | Leng | E06C 1/393 182/194 |
| 2017/0138380 | A1 * | 5/2017 | Leng | E06C 7/08 |
| 2018/0355667 | A1 * | 12/2018 | Wang | E06C 1/387 |

* cited by examiner

STEPPING PLATFORM OF FOLDABLE LADDER

RELATED APPLICATIONS

This application claims priority to Chinese patent application number 202320391979.4, filed on Mar. 6, 2023. Chinese patent application number 202320391979.4 is incorporated herein by reference.

FIELD OF THE DISCLOSURE

The present disclosure relates to a stepping platform of a ladder, and in particular to a stepping platform of a foldable ladder.

BACKGROUND OF THE DISCLOSURE

Under a premise of meeting safety strength requirements, reducing production cost of a stepping platform to a greatest extent is a goal that every manufacturer is striving to achieve. In order to improve strength of the stepping platform, it is a very common way to arrange ribs on the stepping platform. The difference is mainly the size, position, and quantity of the ribs. Therefore, for those skilled in the art, the structural improvement of the stepping platform in a direction of strength has entered a bottleneck stage.

BRIEF SUMMARY OF THE DISCLOSURE

The present disclosure provides a stepping platform of a foldable ladder to solve the deficiencies in the background to better improve strength of the stepping platform.

In order to solve the technical problem, a first technical solution of the present disclosure is as follows.

A stepping platform of a foldable ladder comprises a plate body, a front end cap, and a rear end cap. The plate body, when in use, is rotatably supported between two front leg tubes of the foldable ladder. A connecting line between the two front leg tubes is defined as a left-and-right direction, and an orientation of a face of a user facing toward the foldable ladder is defined as a front-and-rear direction. The front end cap and the rear end cap are respectively connected in an inserted manner to the plate body from the front-and-rear direction, and a bottom of the plate body comprises a plurality of protruding strips extending in the front-and-rear direction. The plurality of protruding strips are a hollow structure, and the plurality of protruding strips are arranged at intervals in the left-and-right direction. The front end cap comprises a plurality of first inserting pins configured to correspond to the plurality of protruding strips, and the rear end cap comprises a plurality of second inserting pins configured to correspond to the plurality of protruding strips. The plurality of first inserting pins and the plurality of second inserting pins are respectively inserted into the plurality of protruding strips.

In a preferred embodiment, a left side and a right side of the plate body symmetrically and respectively comprise a blocking wall extending downward in a vertical direction, and the blocking wall is a hollow structure. A left end and a right end of the front end cap respectively comprise a third inserting pin configured to correspond to the blocking wall, and a left end and a right end of the rear end cap respectively comprise a fourth inserting pin configured to correspond to the blocking wall. The third inserting pin and the fourth inserting pin are respectively inserted into the blocking wall.

In a preferred embodiment, a front half part of the blocking wall comprises a front C-shaped hanging groove having a first bottom opening, and a rear half part of the blocking wall comprises a rear C-shaped hanging groove having a second bottom opening. The front C-shaped hanging groove is rotatably buckled to a front lateral rod connected between the two front leg tubes. The rear C-shaped hanging groove is buckled to a lateral rod connected between two rear leg tubes of the foldable ladder, or the rear C-shaped hanging groove is rotatably buckled to a linkage lateral rod connected to one or more linkage rods of the foldable ladder.

In a preferred embodiment, a distal end of the third inserting pin of the front end cap comprises a first C-shaped buckle hole, and the first C-shaped buckle hole is buckled to the front lateral rod when the third inserting pin is inserted into the blocking wall.

In a preferred embodiment, a distal end of the fourth inserting pin of the rear end cap comprises a second C-shaped buckle hole, and the second C-shaped buckle hole is buckled to the linkage lateral rod when the fourth inserting pin is inserted into the blocking wall.

In a preferred embodiment, when the stepping platform is used as an uppermost stepping platform for being mounted, the bottom of the plate body comprises a buckle, and the buckle is buckled to the lateral rod to make the uppermost stepping platform not rotate. When the buckle is released from the lateral rod, the uppermost stepping platform is configured to be rotated about the front lateral rod to be folded.

In a preferred embodiment, the plate body comprises a plurality of parts which are spliced to one another in the left-and-right direction.

In a preferred embodiment, the plurality of parts are spliced to one another though welding, riveting, or punching engagement.

In a preferred embodiment, the plate body comprises a plurality of reinforcing ribs disposed at intervals in the left-and-right direction and extending along the front-and-rear direction.

In a preferred embodiment, the plate body is an aluminum plate or an iron plate, and the front end cap and the rear end cap are made of plastic or metal.

Compared with the existing techniques, the technical solution has the following advantages.

1. The plurality of protruding strips are hollow for the front end cap and the rear end cap to be inserted into the plurality of protruding strips. In this way, an assembly of the stepping platform is more convenient, and the plurality of protruding strips have a better supporting effect due to the the plurality of first inserting pins and the plurality of second inserting pins being respectively inserted into the plurality of protruding strips so as to improve the strength of the stepping platform.

2. The third inserting pin and the fourth inserting pin are respectively inserted into the blocking wall to increase the strength of two sides of the stepping platform to enable strength of the plate body to be better improved through the front end cap and the rear end cap, so as to prevent the plate body from deformation and improve the strength of the stepping platform.

3. The front C-shaped hanging groove is rotatably buckled to the front lateral rod and the rear C-shaped hanging groove is buckled to the lateral rod or is rotatably buckled to a linkage lateral rod, so that the front lateral rod, the linkage lateral rod, the lateral rod, and the plurality of protruding strips can form a support grid to better improve the strength of the stepping platform.

4. The first C-shaped buckle hole is buckled to the front lateral rod, and the second C-shaped buckle hole is buckled to the linkage lateral rod, so that structure of the stepping platform is more stable and is more convenient to assembly.

DETAILED DESCRIPTION OF THE EMBODIMENTS

The present disclosure will be further described below in combination with the accompanying drawings and embodiments.

Figure 1:
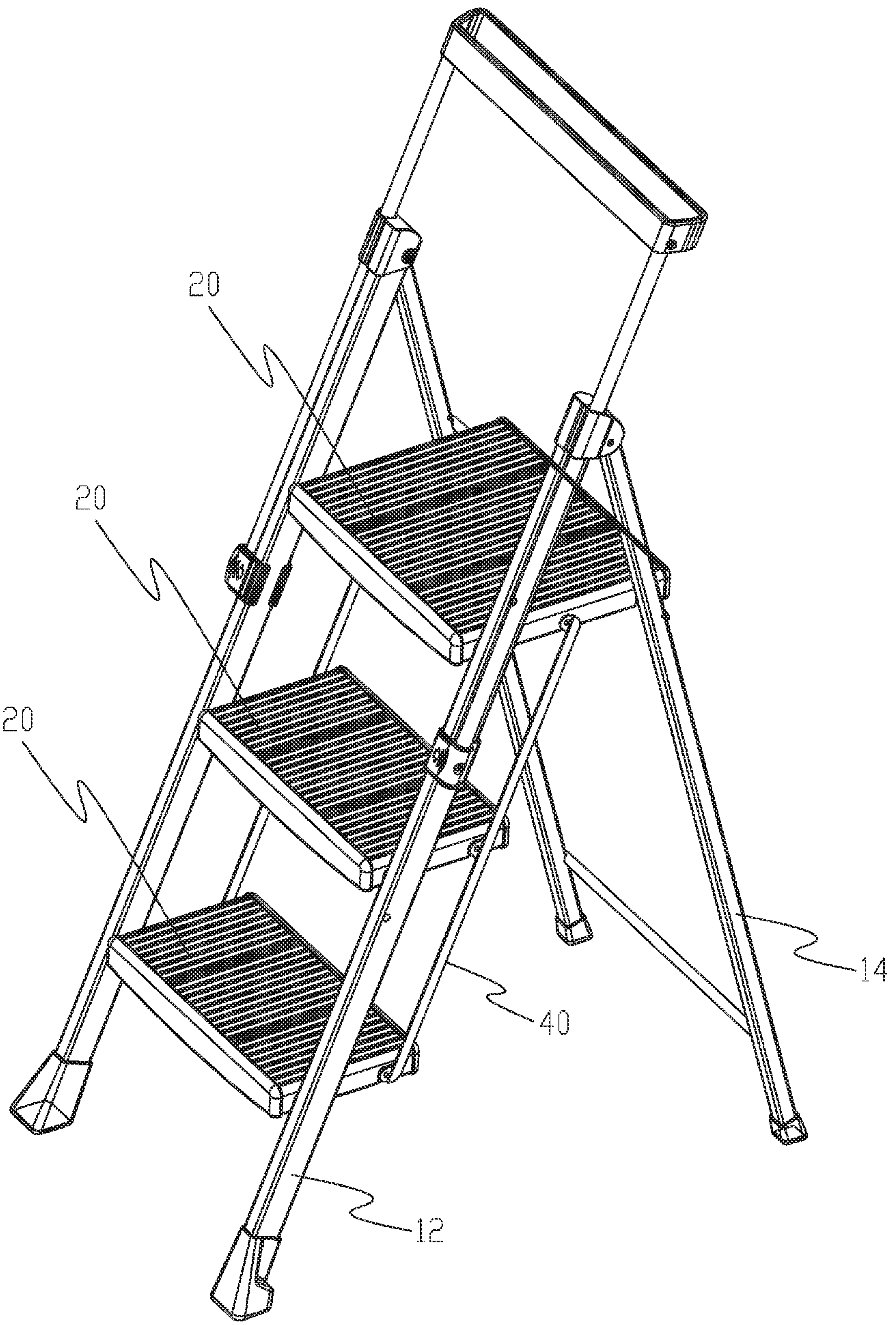
FIG. 1 illustrates a perspective view of a foldable ladder.
Figure 2:
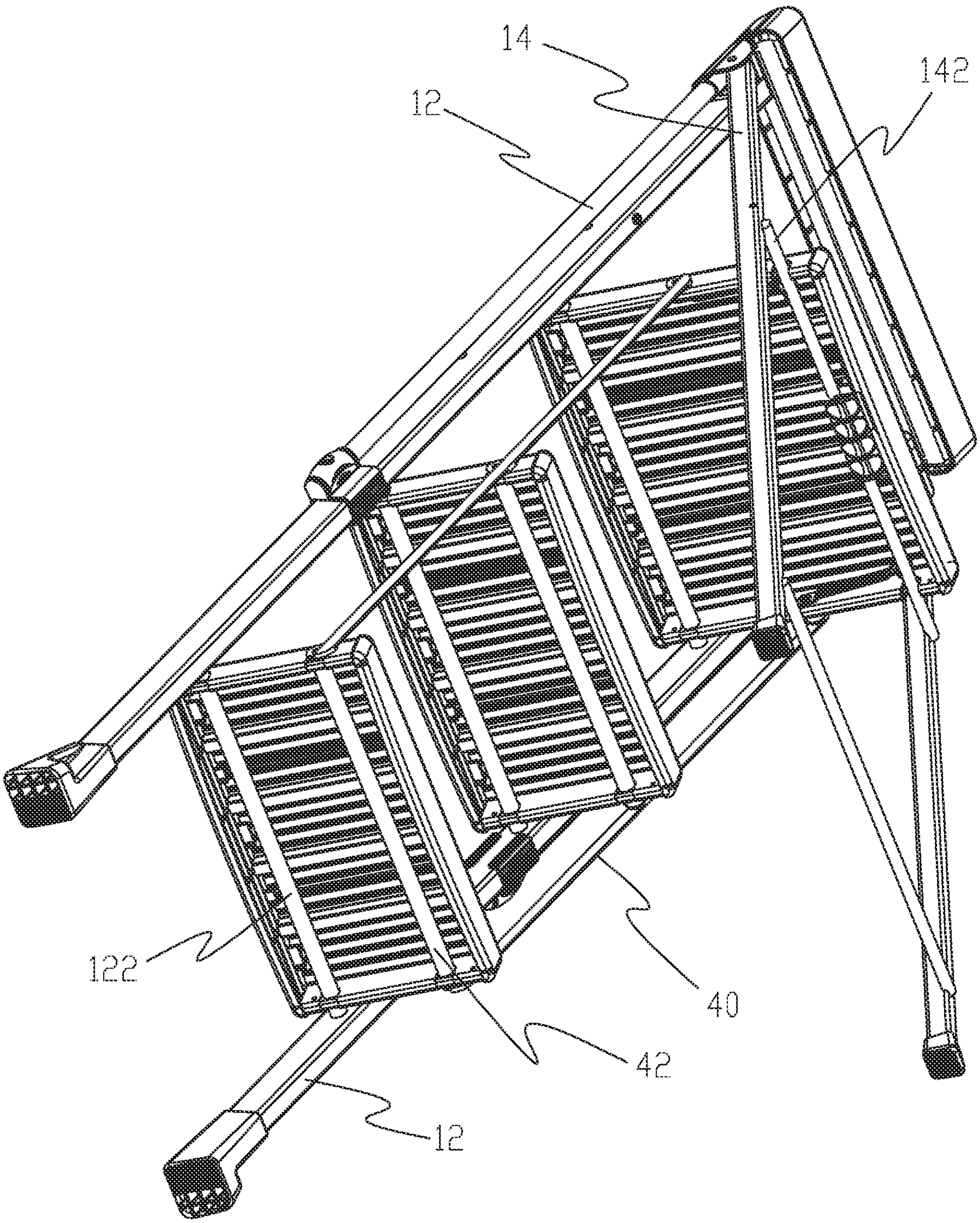
FIG. 2 illustrates another perspective view of the foldable ladder shown in FIG. 1.
Figure 3:
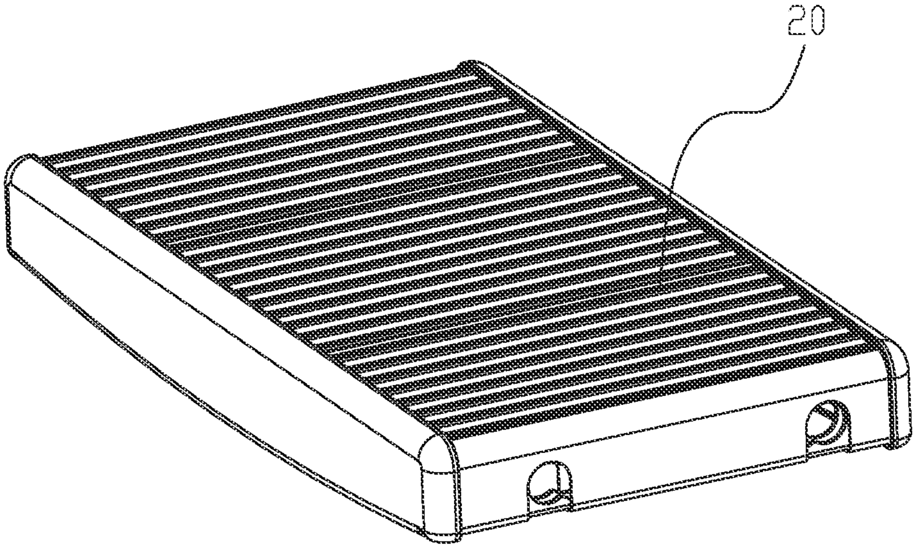
FIG. 3 illustrates a perspective view of a stepping platform of the foldable ladder shown in FIG. 1.
Figure 4:
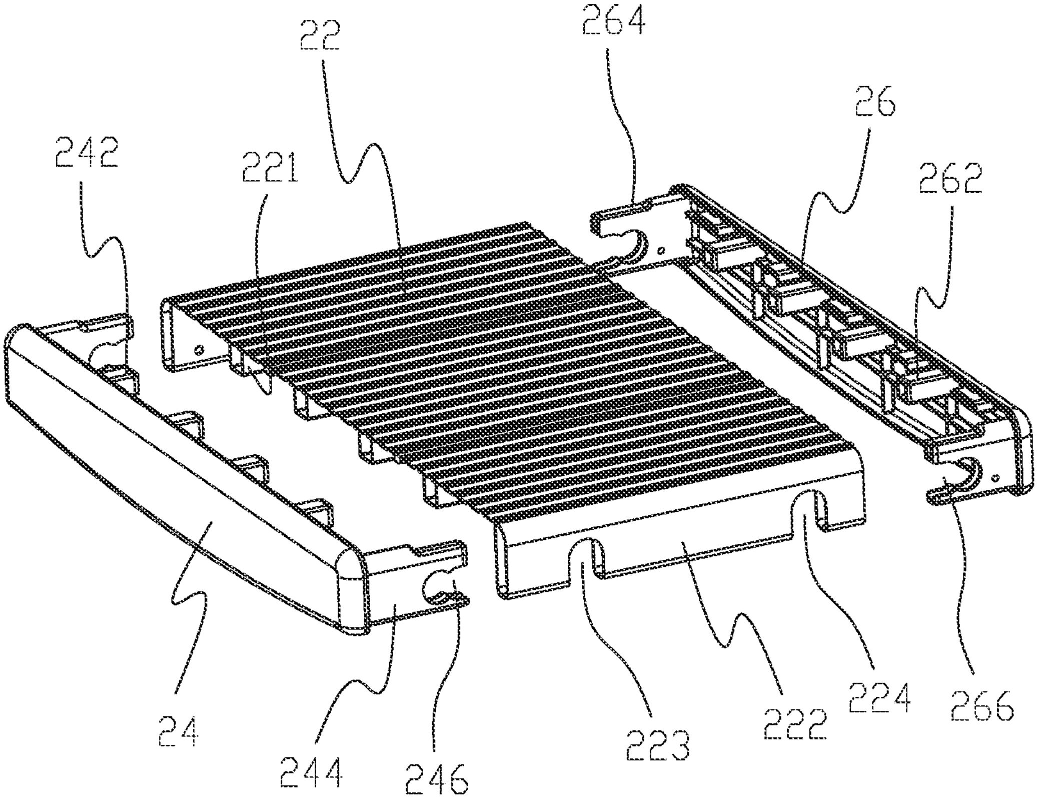
FIG. 4 illustrates an exploded perspective view of the stepping platform shown in FIG. 3.
Figure 5:
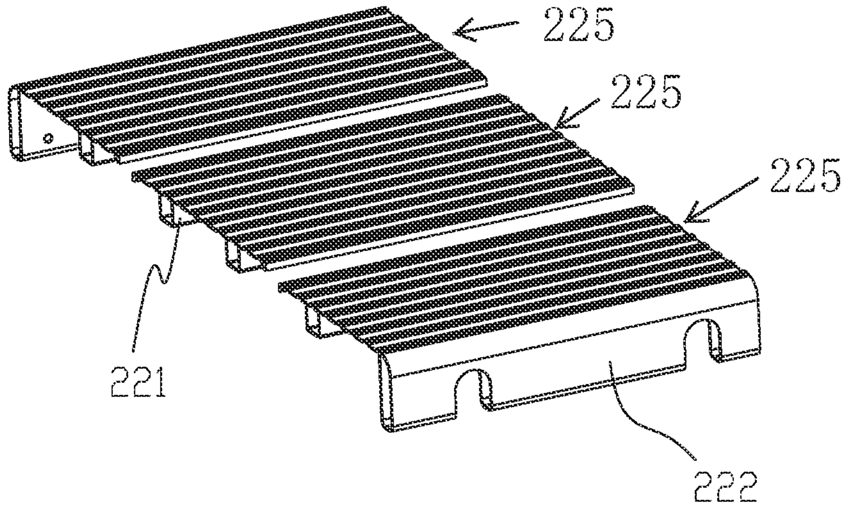
FIG. 5 illustrates an exploded view of a plate body of the stepping platform shown in FIG. 3.
Figure 6:
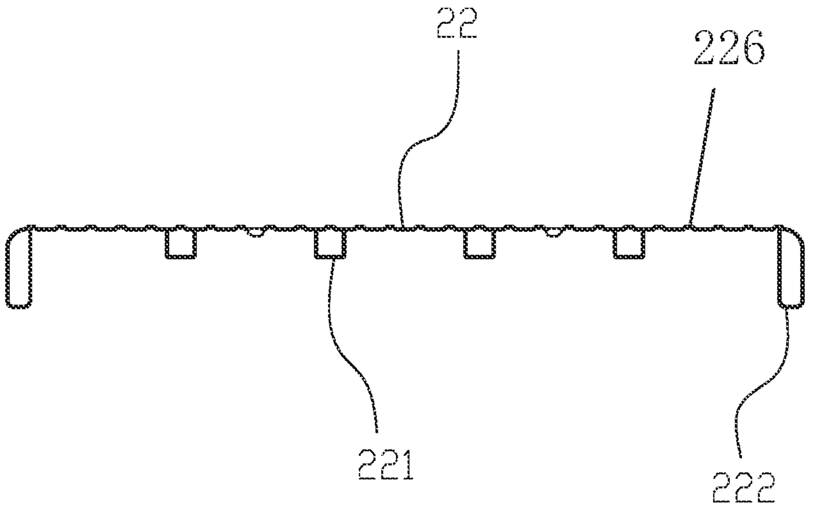
FIG. 6 illustrates a front view of the plate body of the stepping platform shown in FIG. 3.

Referring to FIG. 1 and FIG. 2, a foldable ladder comprises two front leg tubes 12 and two rear leg tubes 14 connected to each other in a foldable manner, and the foldable ladder further comprises a plurality of stepping platforms 20 and one or more linkage rods 40. The two front leg tubes 12 are rotatably connected to the two rear leg tubes 14 in a lambdoid shape. The plurality of stepping platforms 20 are rotatably connected to the two front leg tubes 12 symmetrically arranged in a left-and-right direction. When the foldable ladder is in an unfolding process, an uppermost stepping platform 20 of the plurality of stepping platforms 20 is supported on a lateral rod 142 connected to the two rear leg tubes 14 (i.e., the two rear leg tubes 14 are symmetrically arranged in the left-and-right direction), and the one or more linkage rods 40 are connected to the plurality of stepping platforms 20 to enable the plurality of stepping platforms 20 to be operatively coupled to one another. A basic structure and a folding principle of the foldable ladder are described as above, and the basic structure and the folding principle of the foldable ladder can be referenced in existing technologies.

Referring to FIG. 1 to FIG. 6, each of the plurality of stepping platforms 20 comprises a plate body 22, and the plate body 22, when in use, is rotatably supported between the two front leg tubes 12. In the present disclosure, a connecting line between the two front leg tubes 12 is defined as the left-and-right direction, and when using the foldable ladder, an orientation of a face of a user facing toward the foldable ladder is defined as a front-and-rear direction. Each of the plurality of stepping platforms 20 further comprises a front end cap 24 and a rear end cap 26, and the front end cap 24 and the rear end cap 26 are respectively connected in an inserted manner to the plate body 22 from the front-and-rear direction. A bottom of the plate body 22 comprises a plurality of protruding strips 221 extending in the front-and-rear direction. The plurality of protruding strips 221 are a hollow structure. The plurality of protruding strips 221 are arranged at intervals in the left-and-right direction. The front end cap 24 comprises a plurality of first inserting pins 242 configured to correspond to the plurality of protruding strips 221, and the rear end cap 26 comprises a plurality of second inserting pins 262 configured to correspond to the plurality of protruding strips 221. The plurality of first inserting pins 242 and the plurality of second inserting pins 262 are respectively inserted into the plurality of protruding strips 221.

Preferably, a left side and a right side of the plate body 22 symmetrically and respectively comprise a blocking wall 222 extending downward in a vertical direction. The blocking wall 222 is a hollow structure. A left end and a right end of the front end cap 24 respectively comprise a third inserting pin 244 configured to correspond to the blocking wall 222, and a left end and a right end of the rear end cap 26 respectively comprise a fourth inserting pin 264 configured to correspond to the blocking wall 222. The third inserting pin 244 and the fourth inserting pin 264 are respectively inserted into the blocking wall 222.

Preferably, a front half part of the blocking wall 222 comprises a front C-shaped hanging groove 223 having a first bottom opening, and a rear half part of the blocking wall 222 comprises a rear C-shaped hanging groove 224 having a second bottom opening. The front C-shaped hanging groove 223 is rotatably buckled to a front lateral rod 122 connected between the two front leg tubes 12 to enable each of the plurality of stepping platforms 20 to be rotated between an open state and a folded state. The rear C-shaped hanging groove 224 of the uppermost stepping platform 20 of the plurality of stepping platforms 20 is buckled to the lateral rod 142 connected between the two rear leg tubes 14, and when the foldable ladder is open, the uppermost stepping platform 20 can be supported in a more stable manner. The rear C-shaped hanging groove 224 of each of the rest of the plurality of stepping platforms 20 is rotatably buckled to a linkage lateral rod 42 connected to the one or more linkage rods 40 of the foldable ladder. It can be understood that when the front lateral rod 122 and the linkage lateral rod 42 are omitted, the plurality of stepping platforms 20 are directly rotatably connected to the two front leg tubes 12. In this manner, the plurality of stepping platforms 20 can also be turned over, and the one or more linkage rods 40 directly support the plurality of stepping platforms 20. However, in this embodiment, the front lateral rod 122, the linkage lateral rod 42, the lateral rod 142, and the plurality of protruding strips 221 can form a support grid, so as to better improve strength of the plurality of stepping platforms 20 in use.

Preferably, a distal end of the third inserting pin 244 of the front end cap 24 comprises a first C-shaped buckle hole 246, and the first C-shaped buckle hole 246 is buckled to the front lateral rod 122 when the third inserting pin 244 is inserted into the blocking wall 222.

Preferably, a distal end of the fourth inserting pin 264 of the rear end cap 26 comprises a second C-shaped buckle hole 266, and the second C-shaped buckle hole 266 is buckled to the linkage lateral rod 42 when the fourth inserting pin 264 is inserted into the blocking wall 222. The bottom of the plate body 22 of one of the plurality of stepping platforms 20 that is used as the uppermost stepping platform 20 comprises a buckle, and the buckle is buckled to the lateral rod 142 to make the uppermost stepping platform 20 not rotate. When the buckle is released from the lateral rod 142, the uppermost stepping platform 20 can be rotated about the front lateral rod 122 to be folded.

Preferably, the plate body 22 comprises a plurality of parts 225 which are spliced to one another in the left-and-right direction. More preferably, the plurality of parts 225 are spliced to one another through welding, riveting, or punching engagement.

Preferably, the plate body 22 comprises a plurality of reinforcing ribs 226 disposed at intervals in the left-and-right direction and extending along the front-and-rear direction.

In addition, the plate body 22 is an aluminum plate or an iron plate, and the front end cap 24 and the rear end cap 26 are made of plastic or metal.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A stepping platform of a foldable ladder, comprising:
a plate body,
two front leg tubes,
two rear leg tubes,
a front end cap, and
a rear end cap, wherein:
the plate body, when in use, is rotatably supported between the two front leg tubes,
a lateral rod is connected between the two rear leg tubes,
the front end cap and the rear end cap are respectively connected in an inserted manner to the plate body from a front-and-rear direction,
a bottom of the plate body comprises a plurality of protruding strips extending in the front-and-rear direction,
the plurality of protruding strips are hollow structures,
the plurality of protruding strips are arranged at intervals in a left-and-right direction,
the front end cap comprises a plurality of first inserting pins configured to correspond to the plurality of protruding strips,
the rear end cap comprises a plurality of second inserting pins configured to correspond to the plurality of protruding strips,
the plurality of first inserting pins and the plurality of second inserting pins are respectively inserted into the plurality of protruding strips, and
when the stepping platform is unfolded, the plate body is detachably fixed to the lateral rod.

2. The stepping platform of the foldable ladder according to claim 1, wherein:
a left side and a right side of the plate body each symmetrically and respectively comprise a blocking wall extending downward in a vertical direction,
the blocking walls are hollow structures,
a left end and a right end of the front end cap respectively comprise third inserting pins configured to correspond to the blocking walls,
a left end and a right end of the rear end cap respectively comprise fourth inserting pins configured to correspond to the blocking walls, and
the third inserting pins and the fourth inserting pins are respectively inserted into the blocking walls.

3. The stepping platform of the foldable ladder according to claim 2, wherein:
a front half part of each of the blocking walls comprises a front C-shaped hanging groove having a first bottom opening,
a rear half part of each of the blocking walls comprises a rear C-shaped hanging groove having a second bottom opening,
the front C-shaped hanging grooves are is rotatably buckled to a front lateral rod connected between the two front leg tubes, and
the rear C-shaped hanging grooves are buckled to the lateral rod, or the rear C-shaped hanging grooves are rotatably buckled to a linkage lateral rod connected to one or more linkage rods of the foldable ladder.

4. The stepping platform of the foldable ladder according to claim 3, wherein:
a distal end of each of the third inserting pins of the front end cap comprises a first C-shaped buckle hole, and
the first C-shaped buckle holes are buckled to the front lateral rod when the third inserting pins are inserted into the blocking walls.

5. The stepping platform of the foldable ladder according to claim 3, wherein:
a distal end of each of the fourth inserting pins of the rear end cap comprises a second C-shaped buckle hole, and
the second C-shaped buckle holes are buckled to the linkage lateral rod when the fourth inserting pins are is inserted into the blocking walls.

6. The stepping platform of the foldable ladder according to claim 3, wherein:
when the stepping platform is used as an uppermost stepping platform for being mounted:
the bottom of the plate body comprises a buckle, and
the buckle is buckled to the lateral rod to make the uppermost stepping platform not rotate, and
when the buckle is released from the lateral rod, the uppermost stepping platform is configured to be rotated about the front lateral rod to be folded.

7. The stepping platform of the foldable ladder according to claim 1, wherein:
the plate body comprises a plurality of parts which are spliced to one another in the left-and-right direction.

8. The stepping platform of the foldable ladder according to claim 7, wherein:
the plurality of parts are spliced to one another though welding, riveting, or punching engagement.

9. The stepping platform of the foldable ladder according to claim 1, wherein:
the plate body comprises a plurality of reinforcing ribs disposed at intervals in the left-and-right direction and extending along the front-and-rear direction.

10. The stepping platform of the foldable ladder according to claim 7, wherein:
the plate body comprises a plurality of reinforcing ribs disposed at intervals in the left-and-right direction and extending along the front-and-rear direction.

11. The stepping platform of the foldable ladder according to claim 1, wherein:
the plate body is an aluminum plate or an iron plate, and
the front end cap and the rear end cap are made of plastic or metal.

* * * * *